United States Patent
Shoji et al.

(10) Patent No.: US 7,239,586 B2
(45) Date of Patent: Jul. 3, 2007

(54) OPTICAL DISK DEVICE AND RECORDING POWER DETERMINING METHOD

(75) Inventors: Mamoru Shoji, Sakai (JP); Toshiya Akagi, Neyagawa (JP); Atsushi Nakamura, Moriguchi (JP); Ariaki Ito, Ikoma (JP); Yukihiro Yamasaki, Hirakata (JP); Yasuhiro Honda, Wakayama (JP); Takashi Ishida, Yawata (JP); Shinichi Konishi, Nara (JP); Yuji Hisakado, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 573 days.

(21) Appl. No.: 10/333,632

(22) PCT Filed: Jul. 27, 2001

(86) PCT No.: PCT/JP01/06463

§ 371 (c)(1),
(2), (4) Date: Jul. 15, 2003

(87) PCT Pub. No.: WO02/11132

PCT Pub. Date: Feb. 7, 2002

(65) Prior Publication Data

US 2004/0022166 A1 Feb. 5, 2004

(30) Foreign Application Priority Data

Jul. 28, 2000 (JP) .............................. 2000-228597

(51) Int. Cl.
*G11B 5/00* (2006.01)

(52) U.S. Cl. .................. 369/47.53; 369/47.51

(58) Field of Classification Search ............. 369/59.11, 369/47.5, 47.51, 47.52, 47.53, 116, 53.26, 369/53.31
See application file for complete search history.

(56) References Cited

U.S. PATENT DOCUMENTS 6,480,449 B1 11/2002 Narumi et al.
6,952,384 B1 * 10/2005 Shoji et al. .............. 369/44.35

FOREIGN PATENT DOCUMENTS

| CN | 1250208 | 4/2000 |
|---|---|---|
| EP | 0 400 726 | 12/1990 |
| EP | 0 404 249 | 12/1990 |
| EP | 0 599 389 | 6/1994 |
| EP | 0 889 468 | 1/1999 |
| EP | 0 991 060 | 4/2000 |
| JP | 10-11755 | 1/1998 |
| JP | 10-320777 | 12/1998 |

* cited by examiner

*Primary Examiner*—Tan Dinh
*Assistant Examiner*—Adam R. Giesy
(74) *Attorney, Agent, or Firm*—Wenderoth, Lind & Ponack, L.L.P.

(57) ABSTRACT

An optical disk drive and recording power determination method determine the optimum power with consideration for the recording state of a base layer track when determining the optimum power by test recording before recording user data. After recording at a second recording power that is higher than a first recording power by a specific amount, recording is performed at a third recording power that is lower than the first recording power by a specific amount, and the first recording power is set to the recording power for data recording when a specified playback signal quality is achieved.

34 Claims, 15 Drawing Sheets

Fig. 11

| | | | | 172 bytes | | | | P1 10 bytes | |
|---|---|---|---|---|---|---|---|---|---|
| B 0,0 | B 0,1 | | B 0,170 | B 0,171 | B 0,172 | | B 0,181 | | |
| B 1,0 | B 1,1 | | B 1,170 | B 1,171 | B 1,172 | | B 1,181 | | |
| B 2,0 | B 2,1 | | B 2,170 | B 2,171 | B 2,172 | | B 2,181 | | |
| | | | | | | | | | |
| B 189,0 | B 189,1 | | B 189,170 | B 189,171 | B 189,172 | | B 189,181 | | |
| B 190,0 | B 190,1 | | B 190,170 | B 190,171 | B 190,172 | | B 190,181 | | |
| B 191,0 | B 191,1 | | B 191,170 | B 191,171 | B 191,172 | | B 191,181 | | |
| B 192,0 | B 192,1 | | B 192,170 | B 192,171 | B 192,172 | | B 192,181 | | |
| | | | | | | | | | |
| B 207,0 | B 207,1 | | B 207,170 | B 207,171 | B 207,172 | | B 207,181 | | |

192 rows

PO 192 rows

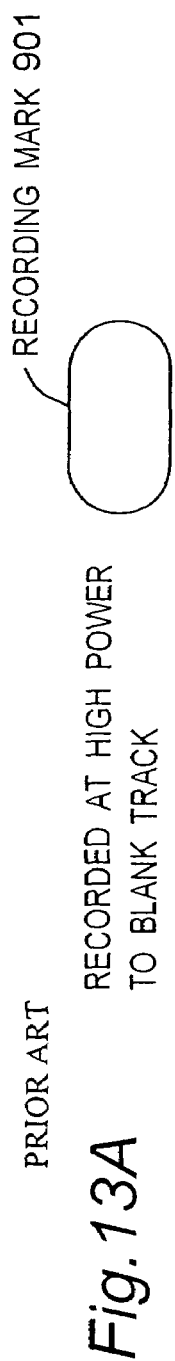
Fig.13A  PRIOR ART  RECORDED AT HIGH POWER TO BLANK TRACK
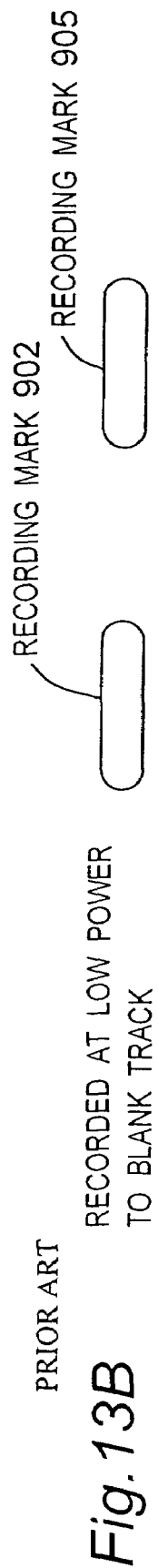
Fig.13B  PRIOR ART  RECORDED AT LOW POWER TO BLANK TRACK
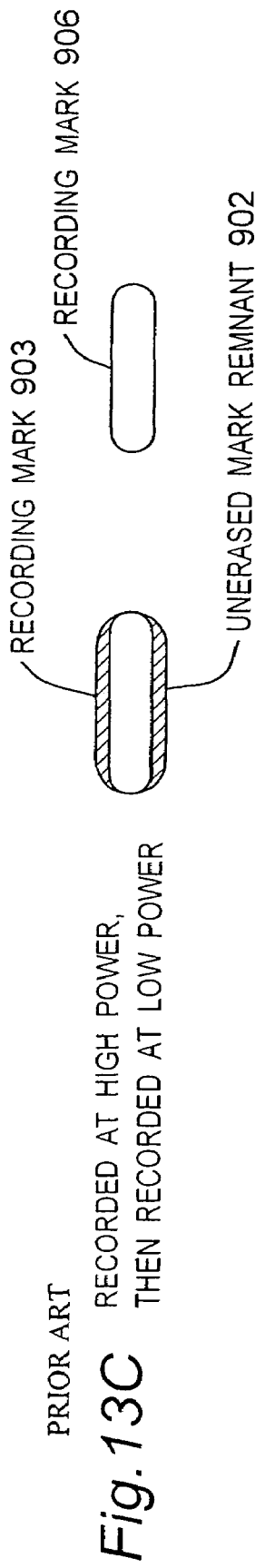
Fig.13C  PRIOR ART  RECORDED AT HIGH POWER, THEN RECORDED AT LOW POWER

OPTICAL DISK DEVICE AND RECORDING POWER DETERMINING METHOD

TECHNICAL FIELD

The present invention relates to a method for determining the optimum recording power in an optical disc drive that records information by emitting a laser beam to an optical disc medium.

BACKGROUND ART

Optical disc drives have been widely developed in recent years as a means for recording and reproducing large amounts of data. Various approaches have been used to achieve ever higher recording densities, and one of these is the phase-change optical disc drive using a reversible state change between crystalline and amorphous phases.

A phase-change optical disc drive forms marks (amorphous parts) and spaces (crystalline parts) disposed between marks on an optical disc medium by emitting a semiconductor laser to the optical disc medium at two power levels, a peak power level for making a crystalline part amorphous, and a bias power level for making an amorphous part crystalline.

Because reflectivity differs in marks and spaces, a recorded signal is read during playback by using this difference in reflectivity.

The configuration of a conventional phase-change optical disc drive is shown in FIG. 14. In FIG. 14, reference numeral 1001 denotes an optical disc, reference numeral 1002 denotes an optical head, reference numeral 1003 denotes a playback means, reference numeral 1004 denotes a playback signal quality detection means, reference numeral 1005 denotes an optimum recording power determining means, reference numeral 1006 denotes a recording means, reference numeral 1007 denotes a laser drive circuit, and reference numeral 1008 denotes a recording power setting means.

The track configuration of a conventional optical disc 1001 is shown in FIG. 15. The optical disc 1001 is an optical disc having recording areas in both the groove-shaped tracks (groove tracks 1101) and the tracks between grooves (land tracks 1102), forming a continuous spiral by alternating the groove tracks and land tracks every revolution.

After the optical disc 1001 is loaded into the optical disc drive and specific operations for identifying the disc type and rotation control are completed, the optical head 1002 moves to an area for determining the optimum emission power. Note that this area is provided at the innermost circumference or the outermost circumference of the disc, and is a recording area that is separate from the user area for recording user data.

Both peak power and bias power are determined with a phase-change optical disc drive, and the method for determining the peak power is described here.

First, initial values for the peak power and bias power are set in the laser drive circuit 1007 by the recording power setting means 1008. The power for recording to a land track and the power for recording to a groove track are equal at this time.

A signal for recording one land track revolution and one groove track revolution from a specific position is then sent from the recording means 1006 to the laser drive circuit 1007 and recorded by the optical head 1002. The light output of the semiconductor laser that is a component of the optical head 1002 is gathered as a light spot on the optical disc 1001, and a recording mark is formed according to the light emission waveform.

When land track and groove track recording ends, the semiconductor laser of the optical head 1002 emits at the playback power level, the track just recorded is played back, and a signal 1009 that varies according to the presence of a recording mark on the optical disc 1001 is input to the playback means 1003 as a playback signal. The playback signal 1009 is subjected to playback signal processing such as amplification, waveform equalization, and digitizing by the playback means 1003, and a signal 1010 is then input to the playback signal quality detection means 1004.

The playback signal quality detection means 1004 detects the signal quality of the signal 1010, and inputs the detection result to the optimum recording power determining means 1005.

The playback signal quality detection means 1004 here detects the BER (byte error rate) when the recorded signal is played back. The BER detected at this time is the average for the reproduced track. The relationship between peak power and BER is shown in FIG. 16.

The horizontal axis is peak power and the vertical axis is the BER in FIG. 16. If the playback conditions are equal, recording accuracy generally increases as the BER decreases. Therefore, if the BER is less than or equal to a given threshold value, the detection result is OK, and if the BER is greater than or equal to the threshold value, the detection result is NG.

Following the flow chart in FIG. 17, for example, the optimum recording power determining means 1005 sets the peak power higher than the initial power level if the first result from the playback signal quality detection means 1004 is NG, for example, sets the peak power lower than the initial power level if the result is OK, and then records and plays a land track and groove track at the set peak power in the same way as before.

If the first result from the playback signal quality detection means 1004 is NG and the second result is OK, the optimum recording power determining means 1005 determines the average power of the present peak power and the previous peak power plus a specific margin to be the optimum recording power.

If the first result from the playback signal quality detection means 1004 is OK and the second result is NG, the optimum recording power determining means 1005 determines the average power of the present peak power and the previous peak power plus a specific margin to be the optimum recording power.

However, because the area for determining the optimum emission power and the user area for recording user data are in separate places, a relative tilt can occur between the two areas due, for example, to disc warpage or how the head is mounted, and there are cases with the prior art described above where the user data is recorded with power that is effectively weaker than the emission power set in the area for determining the optimum emission power, and conversely, cases where the user data is recorded with power that is effectively stronger than the emission power set in the area for determining the optimum emission power.

As shown in FIG. 13, mark width is generally fatter (thicker) when recorded with strong emission power. Therefore, a problem is that when a track which is recorded with an effectively strong emission power using one recording device is then overwritten with an effectively weaker emission power using another recording device, an unerased mark remnant results in the area where the mark was formed on the base layer. This unerased mark remnant becomes noise during playback, and playback performance drops as a result.

The present invention is directed to the above problem, and provides an optical disc drive and an optimum recording power determination method with an object of recording correctly even when the effective emission power varies.

SUMMARY OF THE INVENTION

To achieve this object in a recording power determination method of an optical disc drive for recording to an optical disc having a spiral track, a recording power determination method of the present invention records at a first recording power (P3), records at a second recording power (P4) that is lower than the first recording power by a specific amount and plays back, determines whether or not a specified playback signal quality is achieved, and sets the recording power for data recording to a recording power that is greater than or equal to the second recording power and less than or equal to the first recording power when the specific playback signal quality is achieved.

Furthermore, to achieve this object in a recording power determination method of an optical disc drive for recording to an optical disc having a spiral track, a recording power determination method of the present invention records at a second recording power (P3) that is greater than a first recording power (P2)by a specific amount, records at a third recording power (P4) that is lower than the first recording power (P2)by a specific amount and plays back, determines whether or not a specified playback signal quality is achieved, and sets the recording power for data recording to a recording power that is greater than or equal to the third recording power and less than or equal to the second recording power when the specific playback signal quality is achieved.

Furthermore, to achieve this object in a recording power determination method of an optical disc drive for recording to an optical disc having a spiral track, a recording power determination method of the present invention sets the recording power, continuously records with the set recording power to three or more tracks, plays back a track having a recorded track on both sides, determines whether or not a specified playback signal quality is achieved, and sets that recording power to the recording power for data recording when the specific playback signal quality is achieved.

Furthermore, to achieve this object, an optical disc drive according to the present invention has a recording power setting means (unit) for setting a laser beam recording power, a recording means (unit) for recording, a playback means (unit) for reading, a playback signal quality detection means (unit) for detecting a playback signal quality, and a control means (unit). By controlling the recording power setting means, recording means, playback means, and playback signal quality detection means, the control means records at a first recording power (P3), records at a second recording power (P4) that is lower than the first recording power by a specific amount and reads, determines whether or not a specified playback signal quality is achieved, and sets the recording power for data recording to a recording power that is greater than or equal to the second recording power and less than or equal to the first recording power when the specified playback signal quality is achieved.

Furthermore, to achieve this object, an optical disc drive according to the present invention has a recording power setting means (unit) for setting a laser beam recording power, a recording means (unit) for recording, a playback means (unit) for reading, a playback signal quality detection means (unit) for detecting a playback signal quality, and a control means (unit). By controlling the recording power setting means, recording means, playback means, and playback signal quality detection means, the control means records at a second recording power (P3) that is greater than a first recording power (P2)by a specific amount, records at a third recording power (P4) that is lower than the first recording power (P2)by a specific amount and reads, determines whether or not a specified playback signal quality is achieved, and sets the recording power for data recording to a recording power that is greater than or equal to the third recording power and less than or equal to the second recording power when the specific playback signal quality is achieved.

Furthermore, to achieve this object, an optical disc drive according to the present invention has a recording power setting means (unit) for setting a laser beam recording power, a recording means (unit) for recording, a playback means (unit) for reading, a playback signal quality detection means (unit) for detecting a playback signal quality, and a control means (unit). By controlling the recording power setting means, recording means, playback means, and playback signal quality detection means, the control means sets the recording power, continuously records with the set recording power to three or more tracks, reads a track having a recorded track on both sides and determines whether or not a specified playback signal quality is achieved, and sets that recording power to the recording power for data recording when the specific playback signal quality is achieved.

By recording with a recording power having assured upper and lower power margins, an optical disc drive according to the present invention can correctly record data even when recording by an optical disc drive that records with power that is effectively weaker than the emission power determined in the area for determining the optimum emission power to an area recorded by an optical disc drive that records with power that is effectively stronger than the emission power set in the area for determining the optimum emission power.

Moreover, data can be recorded more accurately by recording with recording power when considering cases in which adjacent tracks are recorded.

BRIEF DESCRIPTION OF THE DRAWINGS

FIG. 11 is a configuration diagram of an ECC block in an embodiment of the present invention.

FIG. 13 is a graph of the correlation between peak power and recording mark width.

DESCRIPTION OF THE INVENTION

An optical disc drive according to an embodiment of the present invention is described below with reference to the accompanying drawings.

Figure 1:
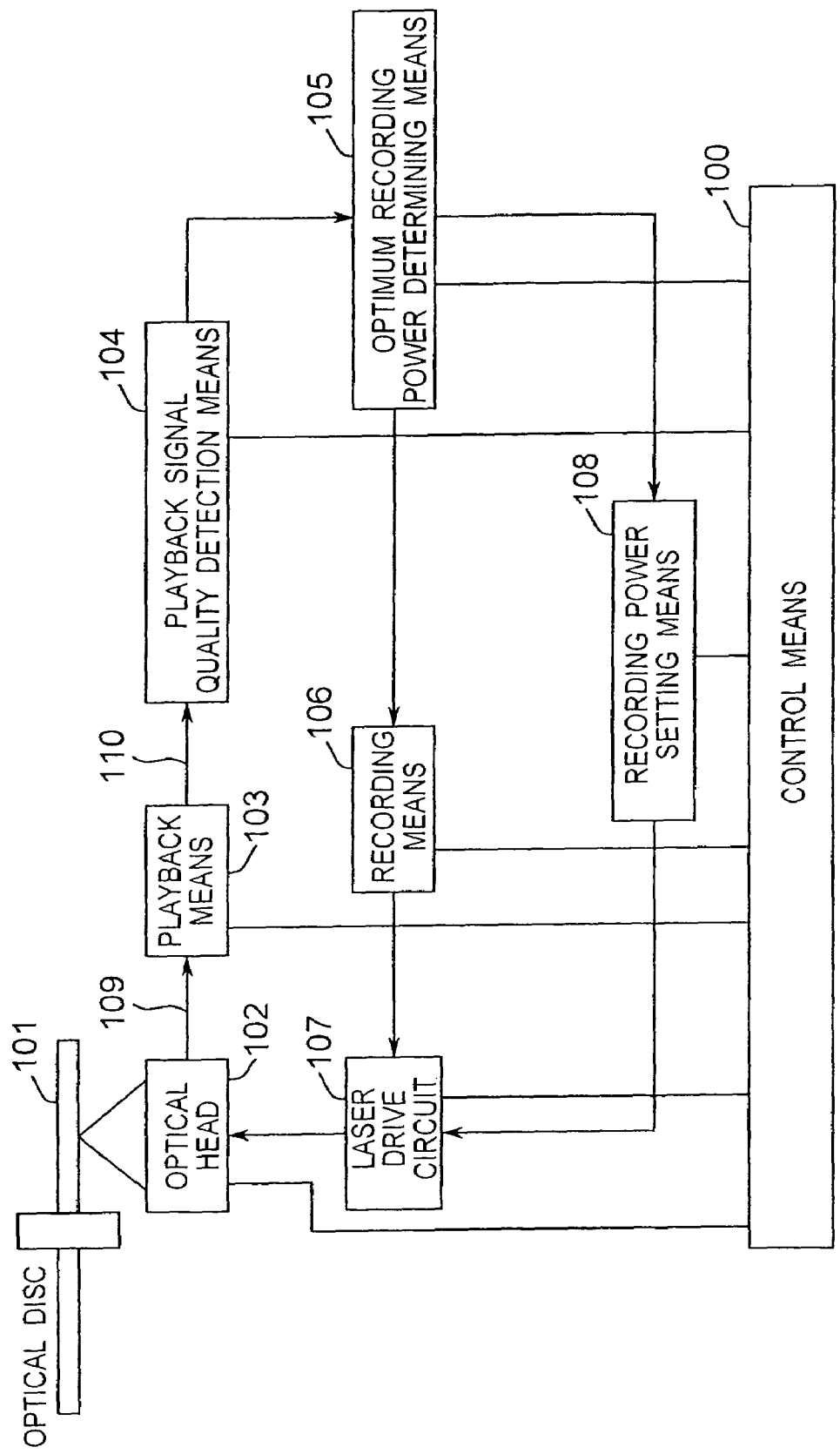
FIG. 1 is a block diagram of an optical disc drive according to an embodiment of the present invention.

FIG. 1 shows the configuration of a phase-change optical disc drive according to an embodiment of the present invention. In FIG. 1, reference numeral 100 denotes a control means (unit), reference numeral 101 denotes an optical disc, reference numeral 102 denotes an optical head, reference numeral 103 denotes a playback means (unit), reference numeral 104 denotes a playback signal quality detection means (unit), reference numeral 105 denotes an optimum recording power determining means (unit), reference numeral 106 denotes a recording means (unit), reference numeral 107 denotes a laser drive circuit, and reference numeral 108 denotes a recording power setting means (unit).

Figure 2:
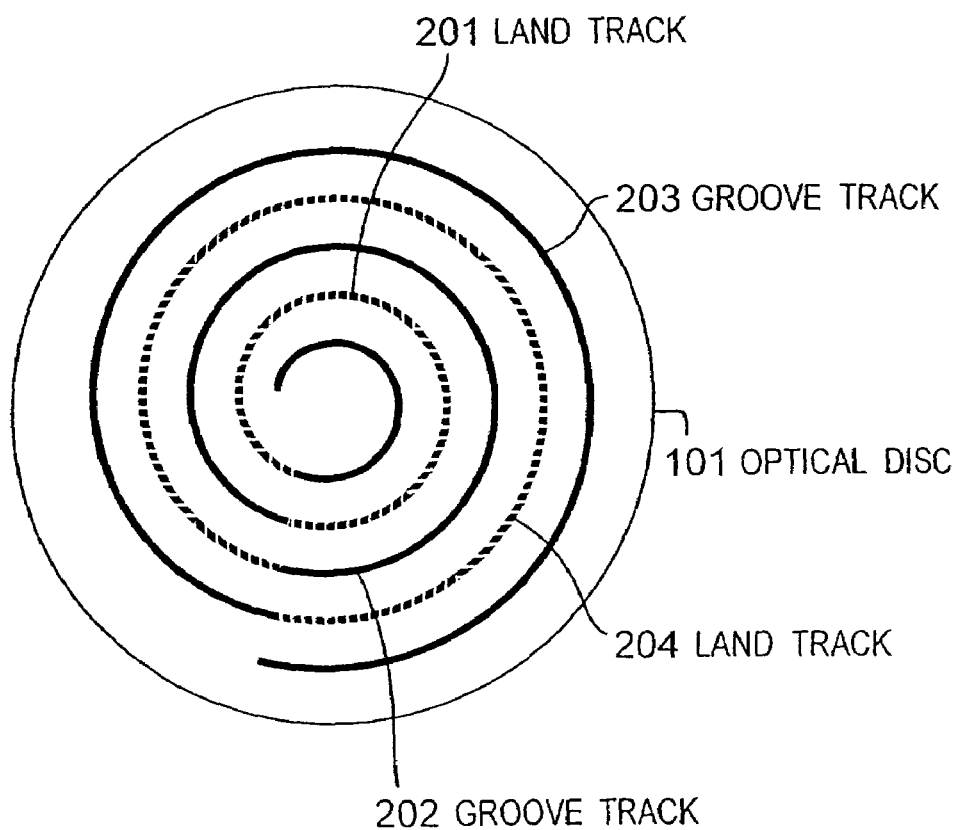
FIG. 2 is a track configuration diagram for an optical disc according to an embodiment of the present invention.

FIG. 2 shows the track configuration of an optical disc 101 in an embodiment of the present invention. The optical disc 101 is an optical disc having recording areas in both the groove-shaped tracks (groove tracks 202, 203) and the tracks between grooves (land tracks 201, 204), forming a continuous spiral by alternating the groove tracks and land tracks every revolution.

After the optical disc 101 is loaded into the optical disc drive and specific operations for identifying the disc type and rotation control are completed, the optical head 102 moves to a test area for determining the optimum recording power.

This test area is part of the recording area and is an area provided at the innermost circumference or the outermost circumference of the disc. There is also a user area for the user to record data in the recording area. An operation for determining the recording power is described below. A sequence of operations by the optical head 102, playback means 103, playback signal quality detection means 104, optimum recording power determining means 105, recording means 106, laser drive circuit 107, and recording power setting means 108 is controlled by the control means 100.

First, initial values for the peak power and bias power are set in the laser drive circuit 107 by the recording power setting means 108. The power for recording to a land track and the power for recording to a groove track are equal at this time.

A test signal for continuously test recording at least one land track revolution or one groove track revolution from a specific position in the test area is then sent from the recording means 106 to the laser drive circuit 107 and recorded by the optical head 102. A case in which one land track revolution and one groove track revolution are continuously test recorded is described in this embodiment. There are approximately 30 sectors in one land track revolution of the test area, and approximately 30 sectors in one groove track revolution. Light output from the semiconductor laser that is a component of the optical head 102 is focused as a spot on the optical disc 101 and a recording mark is formed according to the light emission waveform.

When test recording ends, the semiconductor laser of the optical head 102 emits at the playback power level, continuously reads the previous test-recorded land track revolution and groove track revolution, and a playback signal 109 that changes according to the presence of recording marks on the optical disc 101 is input to the playback means 103 as a playback signal. The playback signal 109 is then subject to playback signal processing such as amplification, waveform equalization, and digitizing, and a signal 110 is input to playback signal quality detection means 104.

The playback signal quality detection means 104 detects the signal quality of the signal 110, and inputs the detection result to the optimum recording power determining means 105. When the number of sectors reproduced from the land track and the number of sectors in the groove track are substantially equal, the reproduced signal quality detection result is the average reproduced signal quality result of both land and groove tracks.

Figure 3:
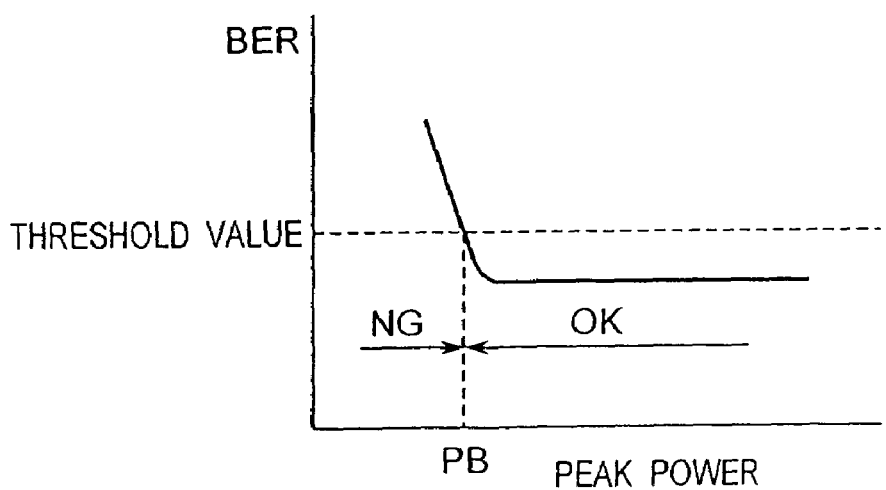
FIG. 3 is a graph showing the correlation between peak power and BER (byte error rate).

The playback signal quality detection means 104 here detects the BER (byte error rate) when reproducing the test-recorded signal. FIG. 3 shows the relationship between peak power and BER. In FIG. 3, the horizontal axis is peak power and the vertical axis is the BER. If the playback conditions are equal, recording accuracy generally increases as the BER decreases.

Therefore, the BER is detected for each sector for the approximately 60 sectors in the test-recorded land track revolution and groove track revolution, and when the detected BER is less than or equal to a specific threshold value, the sector is considered to be an OK sector (a sector that was appropriately recorded). On the other hand, when the detected BER is greater than or equal to a specific threshold value, the sector is considered to be an NG sector (a sector that was not appropriately recorded).

Figure 4:
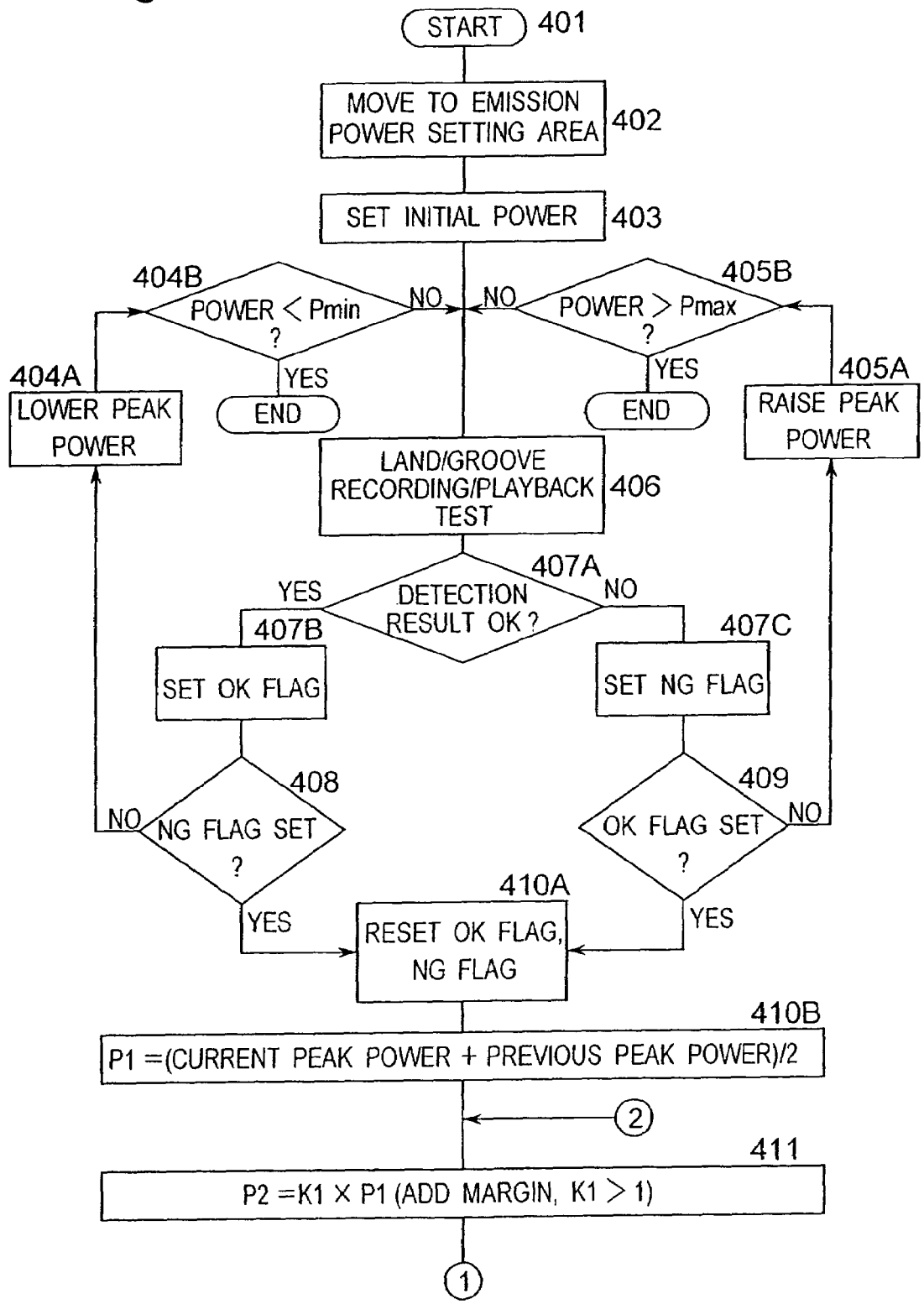
FIG. 4 is a flow chart of an embodiment of the present invention.
Figure 5:
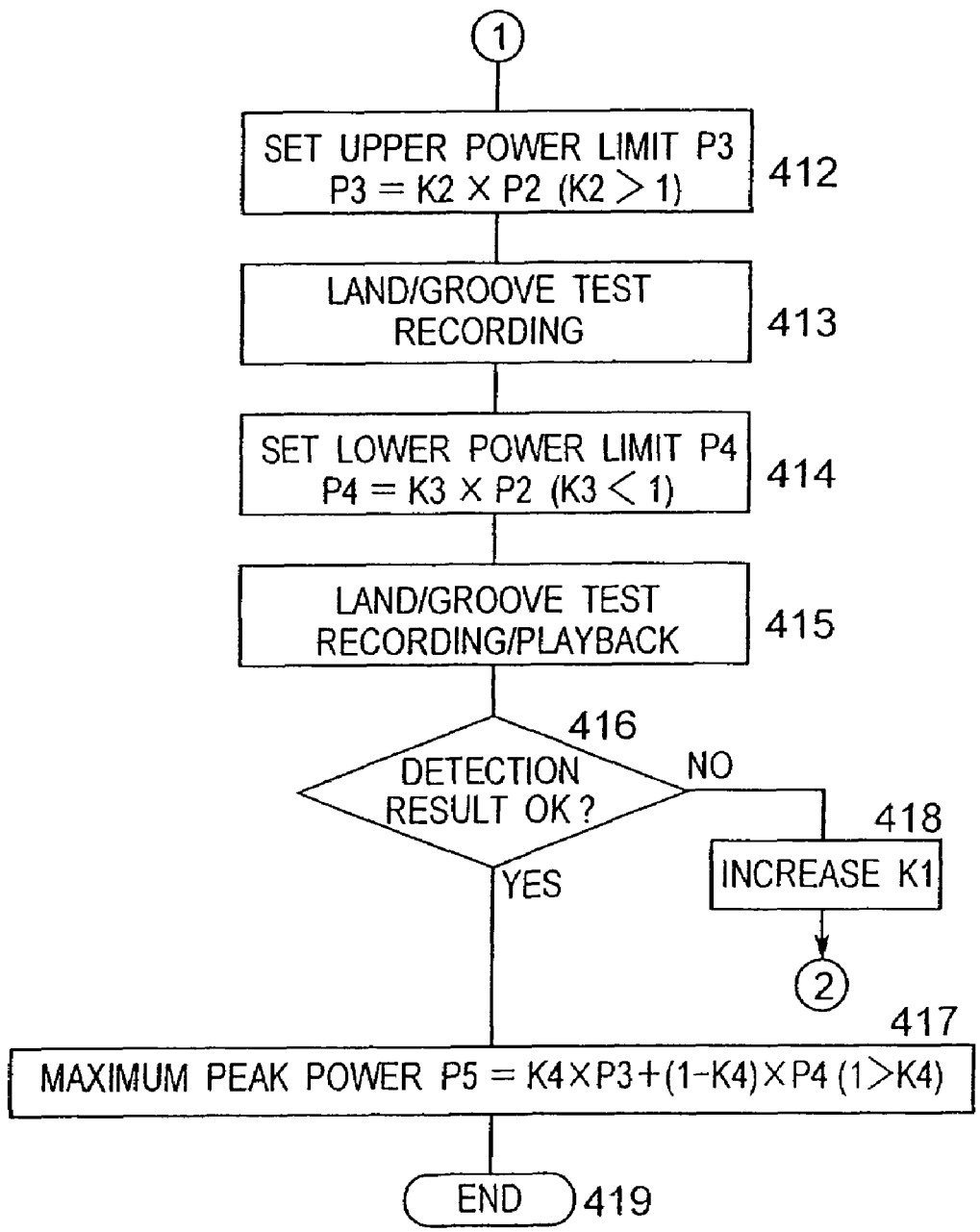
FIG. 5 is a flow chart of an embodiment of the present invention.

The control means 100 controls power determination according to a flow chart as shown in FIG. 4 and FIG. 5, for example.

In step 402, the optical head moves to the test area.

In step 403, the initial peak power is determined. This determination can use (a) a value that is predetermined for the playback device, (b) a value that was determined in a previous power determination operation in the playback device and recorded and stored in the playback device, (c) a value that is pre-written to the optical disc, or (d) a value that was determined in a previous power determination operation in a separate playback device and recorded and stored to the optical disc. This step 403 is executed particularly by the recording power setting means 108.

A land/groove recording/playback test is performed in step 406. As described above, this test continuously test records one land track revolution and one groove track revolution in the test area, and then continuously plays back the same land track and groove track. This step 406 is performed particularly by the recording means 106 and playback means 103.

In step 407A, the BER is detected for each sector, and an OK sector or NG sector determination is made. In addition, whether half or more of the sectors is an OK sector is determined for the approximately 60 sectors in the test-recorded land track and groove track. If half or more of the sectors are OK sectors (that is, if the detection result is OK), the process advances to step 407B, and if half or more of the sectors are NG sectors (that is, the detection result is NG), the procedure advances to step 407C.

In step 407B, an OK flag denoting the detection result of OK is set and the procedure advances to step 408.

In step 407C, an NG flag denoting the detection result of NG is set and the procedure advances to step 409. These steps 407A, 407B, and 407C are executed particularly by the playback signal quality detection means 104.

Whether the NG flag is set, that is, whether the detection result of NG resulted from step 407A in the past (not the immediately preceding step, but step 407A once before), is determined in step 408. If it was output, the procedure advances to step 410A. If not, the procedure goes to step 404A.

In step 404A, the currently set peak power is lowered a specific amount, for example, 5% below the initial power setting.

Whether the peak power after being lowered is less than a predetermined minimum power Pmin is determined in step 404B. If less, recording stops. If not less, the procedure returns to step 406 and the land/groove recording/playback test runs.

Whether the OK flag is set, that is, whether the detection result of OK was output in a past step 407A (not the immediately preceding, but step 407A once before), is determined in step 409. If it was, the procedure advances to step 410A. If it was not output, the procedure goes to step 405A.

In step 405A, the currently set peak power is increased a specific amount, for example, 5% above the initial power setting.

Whether the peak power after being increased is greater than a predetermined maximum power Pmax is determined in step 405B. If greater, recording stops. If not greater, the procedure returns to step 406 and the land/groove recording/playback test runs.

In step 410B, the average power (P1) is obtained from the following equation.

$$P1=\{Pn+(Pn-1)\}/2,$$

where Pn is the selected peak power set after step 404A or after step 405A, and P(n−1) is the previous peak power set before step 404A or before step 405A in the routine in which the selected peak power was obtained.

In step 411, a provisional peak power (P2) is obtained from the following equation.

$$P2=K1 \times P1,$$

where coefficient K1 is a value K1>1 and adds a margin to P1. For example, if K1=1.2, a margin of 20% is added. Steps 408, 404A, 404B, 409, 405A, and 405B are executed particularly by the optimum recording power determining means 105.

When the average power P1 is thus determined it is decided in step 410B after passing step 407B at least once and passing step 407C in the next routine (or after passing step 407C at least once and then passing step 407B in the next routine). This is to set the average peak power P1 near the boundary between the power area where an OK sector is obtained and the power area where an NG sector is obtained, that is, near boundary point PB in FIG. 3.

Three typical cases in which average peak power (P1) and provisional peak power (P2) are calculated are described next.

If half or more of the sectors are NG sectors in the first results from the playback signal quality detection means 104 and half or more of the sectors are OK sectors in the second results, the optimum recording power determining means 105 calculates the provisional peak power (P2) by adding a specific margin to the peak power from the first pass and the average power (P1) of the peak power in the second pass.

If half or more of the sectors are OK sectors in the first results from the playback signal quality detection means 104 and half or more of the sectors are NG sectors in the second results, the optimum recording power determining means 105 calculates the provisional peak power (P2) by adding a specific margin to the peak power from the first pass and the average power (P1) of the peak power in the second pass.

If half or more of the sectors are OK sectors in the first results from the playback signal quality detection means 104 and half or more of the sectors are also OK sectors in the second results, a power level that is less than the peak power used for recording the second time is set, recording and the playback are repeated at this peak power level, and playback signal quality is detected. If half or more of the sectors are NG sectors in the third results from the playback signal quality detection means 104, the optimum recording power determining means 105 calculates the provisional peak power (P2) by adding a specific margin to the peak power from the second pass and the average power (P1) of the peak power in the third pass.

A method for further adjusting the provisional peak power (P2) calculated in step 411 and obtaining the optimum peak power (P5) is described next with reference to the flow chart in FIG. 5, which is a continuation of the flow chart in FIG. 4.

The provisional peak power (P2) will differ according to the recording device in products from different manufacturers, different models from the same manufacturer, and different production periods, but is expected to be within an allowable range (margin).

The upper limit (P3) for the provisional peak power is estimated in step 412, and a land/groove recording test using this upper limit is run in step 413. The upper limit (P3) is estimated by using the following equation.

$$P3=K2 \times P2,$$

where coefficient K2 is a value K2>1, for example, K2=1.05 to 1.10.

A lower limit (P4) for the provisional peak power is estimated in step 414, and a land/groove recording test using this lower limit is run in step 415 in the same area in which the test area was recorded in step 413. The lower limit (P4) is estimated using the next equation.

$$P4=K3 \times P2,$$

where coefficient K3 is a value K3<1, for example, K3=0.90 to 0.95.

A mark from the recording test performed in step 413 is shown in FIG. 13 (a). Because the provisional peak power is at the upper limit in this case, the mark is a relatively fat mark. The mark from the recording test performed in step 415 is shown in FIG. 13 (c). Because the provisional peak power is at the lower limit in this case, the mark is a relatively narrow mark, and an unerased mark remnant of the fat mark is left around the narrow mark. Note that FIG. 13 (b) shows a case in which an unrecorded track is recorded with the provisional peak power at the lower limit.

To check whether such a remnant will adversely affect the playback signal, the BER of each sector is detected and the sectors are determined to be OK sectors or NG sectors in step 416. Whether ⅔ or more of the approximately 60 sectors in the test-recorded land track revolution and groove track revolution are OK sectors is also determined. If 2/3 or more of the sectors are OK sectors (that is, the detection result is OK), the procedure advances to step 417, and if 1/3 or more of the sectors are NG sectors (that is, the detection result is NG), the procedure advances to step 418.

The optimum peak power P5 is calculated from the following equation in step 417.

$$P5 = K4 \times P3 + (1-K4) \times P4,$$

where coefficient K4 is a value K4<1, such as K4=0.5.

Because the playback signal quality should be better than the playback signal quality in step 416 when the playback signal quality is checked by overwriting within the allowable range using power less than or equal to the upper limit and greater than or equal to the lower limit of the provisional peak power, the optimum peak power (P5) internally dividing P4 and P3 at a specific ratio is determined to be the peak power for user data recording.

K1 is increased in step 418. For example, 20% to 25% of the original K1 is added.

It should be noted that the internal division ratio may be set with consideration for the average offset between the emission power determined in the area for determining the optimum emission power and the emission power for user data recording. If the detection result is OK in step 416 when the average offset is small, P2 calculated in step 411 can be used directly as P5.

It should be noted that the playback signal quality detection method is the same in step 407 and step 416 while changing the level for an OK detection result, but different detection methods can be used as described below.

It should be noted that one land track revolution and one groove track revolution are used as the period for continuous recording and continuous playback in the present embodiment, but recording can be by sector unit in an optical disc drive that records by sector unit.

Likewise, one land track revolution and one groove track revolution are used as the period for continuous recording and continuous playback in the present embodiment, but recording can be by block unit in an optical disc drive that records by block unit.

For example, playback signal quality can be detected by recording in ECC (error code correction) block units and counting the number of detected errors. FIG. 11 shows the configuration of a DVD-RAM ECC block, where one ECC block is 182 bytes×208 bytes. Because P1 here is the horizontal parity code and P0 is the vertical parity code, and errors can be detected by detecting these, the block is determined to be NG if, for example, an error is detected in the vertical direction from 8 or more rows of the 208 rows, and the block is determined to be OK if an error is detected in less than eight rows.

By recording with recording a power having assured upper and lower power margins as described in this embodiment of the invention, data can be correctly recorded even when recording with power that is effectively weaker than the emission power determined in the area for determining the optimum emission power to an area recorded with power that is effectively stronger than the emission power set in the area for determining the optimum emission power.

It should be noted that the reasons why the emission power during user data recording differ from the emission power set in the area for determining the optimum emission power include, for example, a relative tilt between the two areas due to disc warpage or the head installation, variation in the radial direction in the recording sensitivity of the disc itself, variation from the set power in the laser power actually output from the optical head, and smudging in the area for determining the optimum emission power. It should be noted that in addition to the above items, the upper and lower power margins depend on multiple factors including the recording performance of the disc and error correction capability, but approximately ±5% to ±10% is appropriate, and an improvement in performance or a reduction in variation is conversely required if a greater margin is necessary.

Furthermore, because the optimum power differs slightly due to slight variations in disc properties in high density recording where the mark length is 0.5 μm or less, optimized recording with an assured power margin is possible by optimizing the margin coefficient K1.

It should be noted that the margin coefficient K1, high power setting coefficient K2, lower power setting coefficient K3, and optimum peak power setting coefficient K4 can be stored in the optical disc drive or recorded to a specific area on the disc.

It should be noted that because the margin coefficient K1 could be changed, the changed value could be stored to the optical disc drive with the information identifying the disc, or the changed value could be recorded to a specific area on the disc together with information for identifying the optical disc drive. By storing the value of K1 after it is changed, the optimum recording power can be efficiently determined at the time of the next recording.

It should be further noted that test recording is performed in step 413 after test recording in step 406 in the present embodiment, but test recording at power level P2 can be performed before test recording at a high power, and erasing with bias power can also be performed. This can reduce the effects of unerased mark remnants due to recording until P1 is determined.

Figure 6:
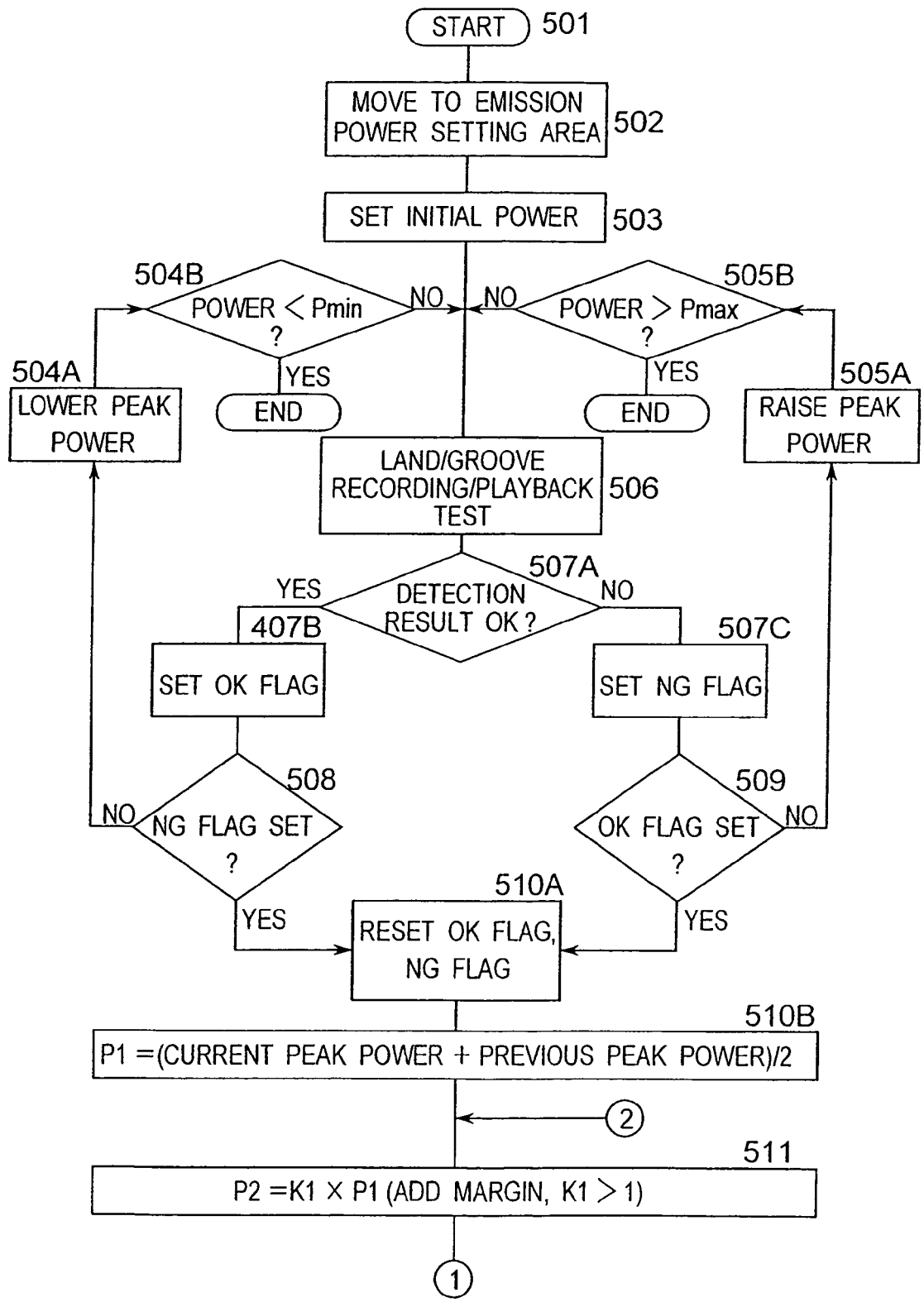
FIG. 6 is a flow chart of an embodiment of the present invention.
Figure 7:
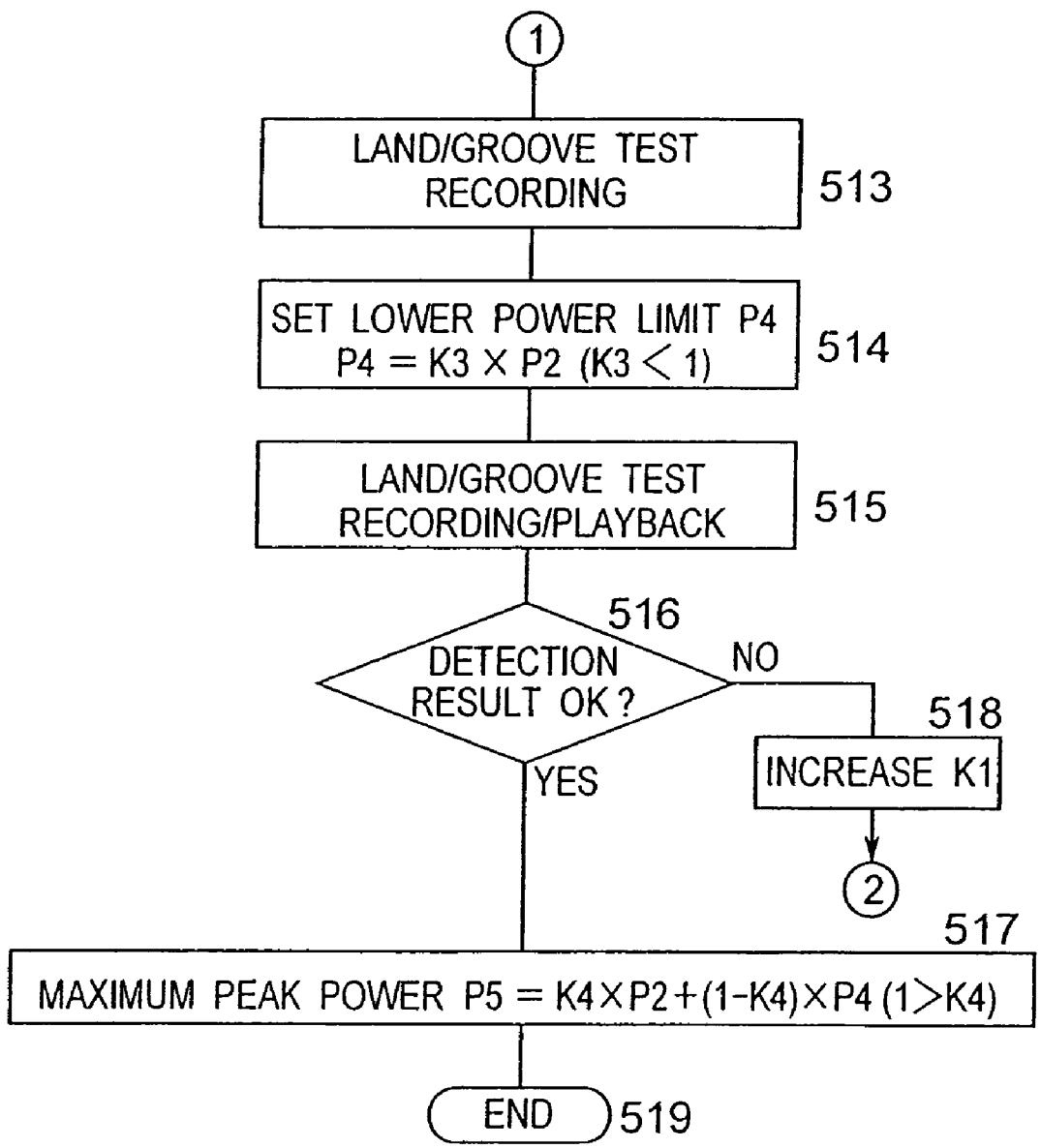
FIG. 7 is a flow chart of an embodiment of the present invention.

Because power may be insufficient in the area for recording user data if there is substantially no tilt to the optical axis in the area for determining the optimum emission power of the disc, recording is performed at the power (P2) to which the margin is not added (step 513) as shown in the flow charts in FIG. 6 and FIG. 7, power (P4) reduced by the margin is then set (step 514), recording and playback are performed at power (P4) (step 515), and the playback signal quality is detected (step 516). If the detection result is OK, a specific power (P5) that is greater than or equal to P4 and less than or equal to P2 is set as the peak power for user data recording (step 517).

When test recording in the area for determining the optimum emission power, only the minimum necessary tracks are often recorded in order to conserve the test recording area and shorten the power setting time. For example, if test recording is performed in part of the groove track 202 and part of the land track 204 in FIG. 2, the optimum recording power can be determined for at least a groove track and land track. However, recording is to adjacent tracks in most cases when actually recording user data, and adjacent tracks may also be recorded at other times. Because this means it is possible for playback signal quality to degrade in the same track, a more precise recording according to user data recording requirements is possible by continuously recording to the land track 201, groove track 202, land track 204, and groove track 203 to determine the optimum recording power. A power determination method considering recording to adjacent tracks is shown in the flow charts in FIG. 8, FIG. 9, and FIG. 10.

It should be noted that the same detection method can be used for detecting playback signal quality while changing the level for determining an OK detection result in step 607 and steps 616 and 622, or different detection methods could be used.

Figure 8:
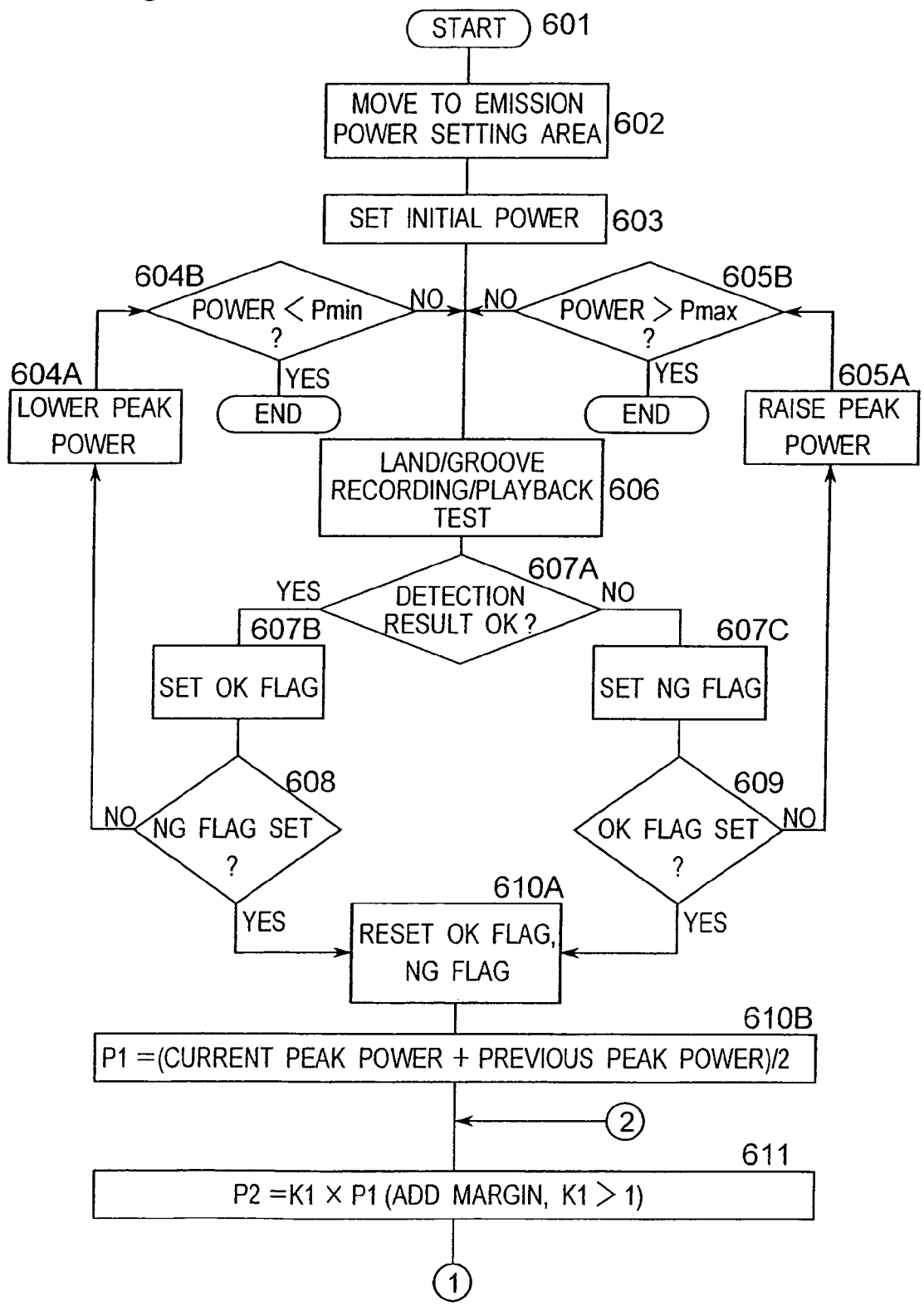
FIG. 8 is a flow chart of an embodiment of the present invention.
Figure 9:
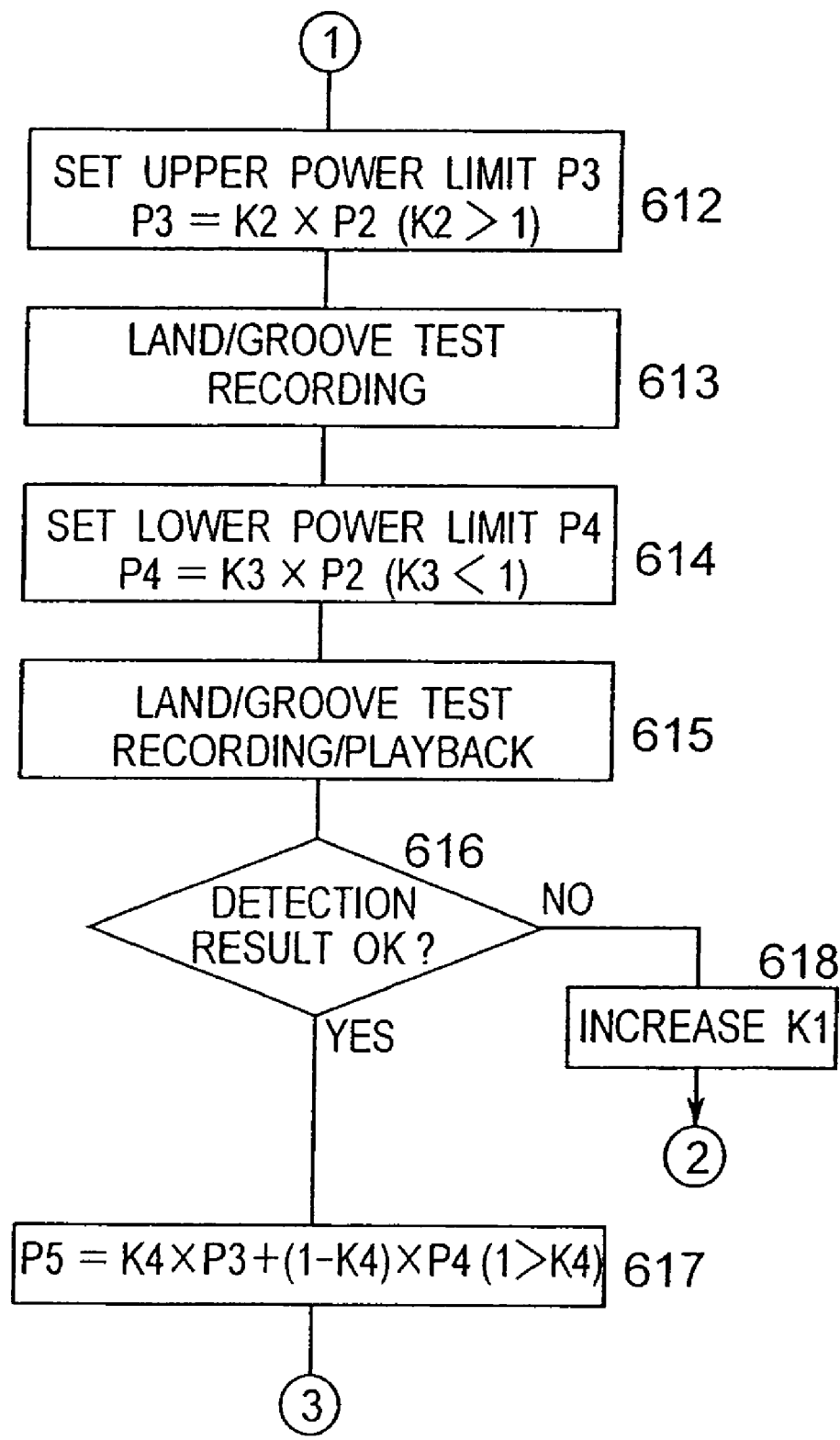
FIG. 9 is a flow chart of an embodiment of the present invention.
Figure 10:
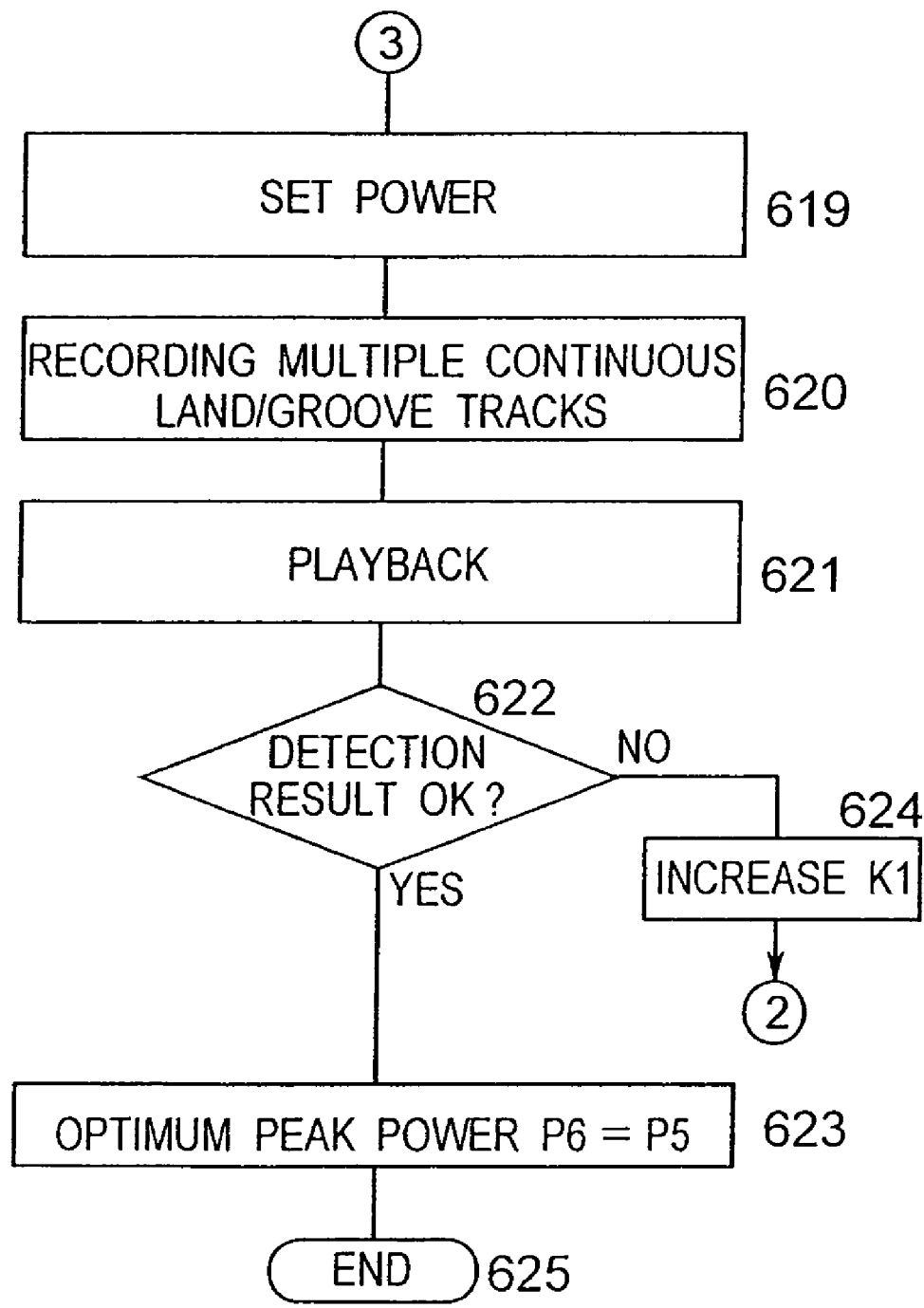
FIG. 10 is a flow chart of an embodiment of the present invention.

Note that this embodiment adds a process for recording adjacent tracks shown in FIG. 10 after the power margin confirmation process shown in FIG. 8 and FIG. 9 (which are the same as FIG. 4 and FIG. 5). This has the effect of determining the optimum recording power with consideration for adjacent tracks even in cases where power margin confirmation is not included.

The power is set in step 619. For example, the peak power is set to the power (P5) obtained in step 617.

Four tracks, that is, land track 201, groove track 202, land track 204, and groove track 203, are continuously recorded in step 620.

The same four tracks are then played back in step 621.

The same check performed in steps 607 and 616 is then performed in step 622, the procedure advances to step 623 if some specific percentage (⅔, for example) or more of the sectors are OK sectors (that is, the detection result was OK), and the procedure advances to step 624 if some specific percentage (⅓, for example) or more of the sectors are NG sectors (that is, the detection result was NG). Because an NG detection result means that peak power was high, a fat mark is recorded and a mark on an adjacent track could be falsely read during playback.

K1 is then reduced in step 624. If the value of K1 is 1.2, for example, it is reduced to 1.18. The percentage of the reduction is, for example, approximately 2% of the first K1 value.

Peak power (P5) is then set as the optimum peak power (P6) in step 623.

It should be noted that four tracks are continuously recorded in this embodiment, but the present invention shall not be limited to four tracks insofar as both adjacent tracks to the track from which playback signal quality is detected are recorded. Furthermore, if the optimum recording power is determined for land tracks only, for example, it is sufficient to record three or more tracks.

It should be further noted that continuous track recording in step 620 follows recording in step 615 in the present embodiment, but recording at power P2 could precede continuous track recording, or erasing at the bias power level could be performed. This can reduce the effects of unerased mark remnants, for example, due to power margin confirmation.

It should be further noted that the playback signal quality detection means 104 detects the BER (byte error rate) when playing back the recorded signal in this present embodiment, but the invention shall not be limited to the BER (byte error rate) and something else such as the bit error rate or jitter, for example, could be used insofar as playback signal quality can be detected.

Figure 12:
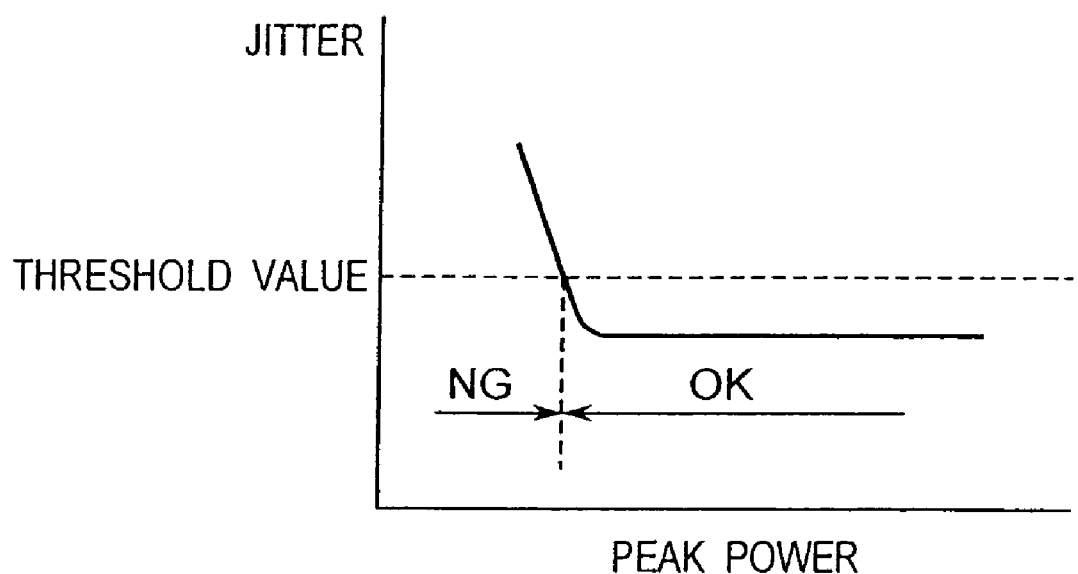
FIG. 12 is a graph of the correlation between peak power and jitter.
Figure 14:
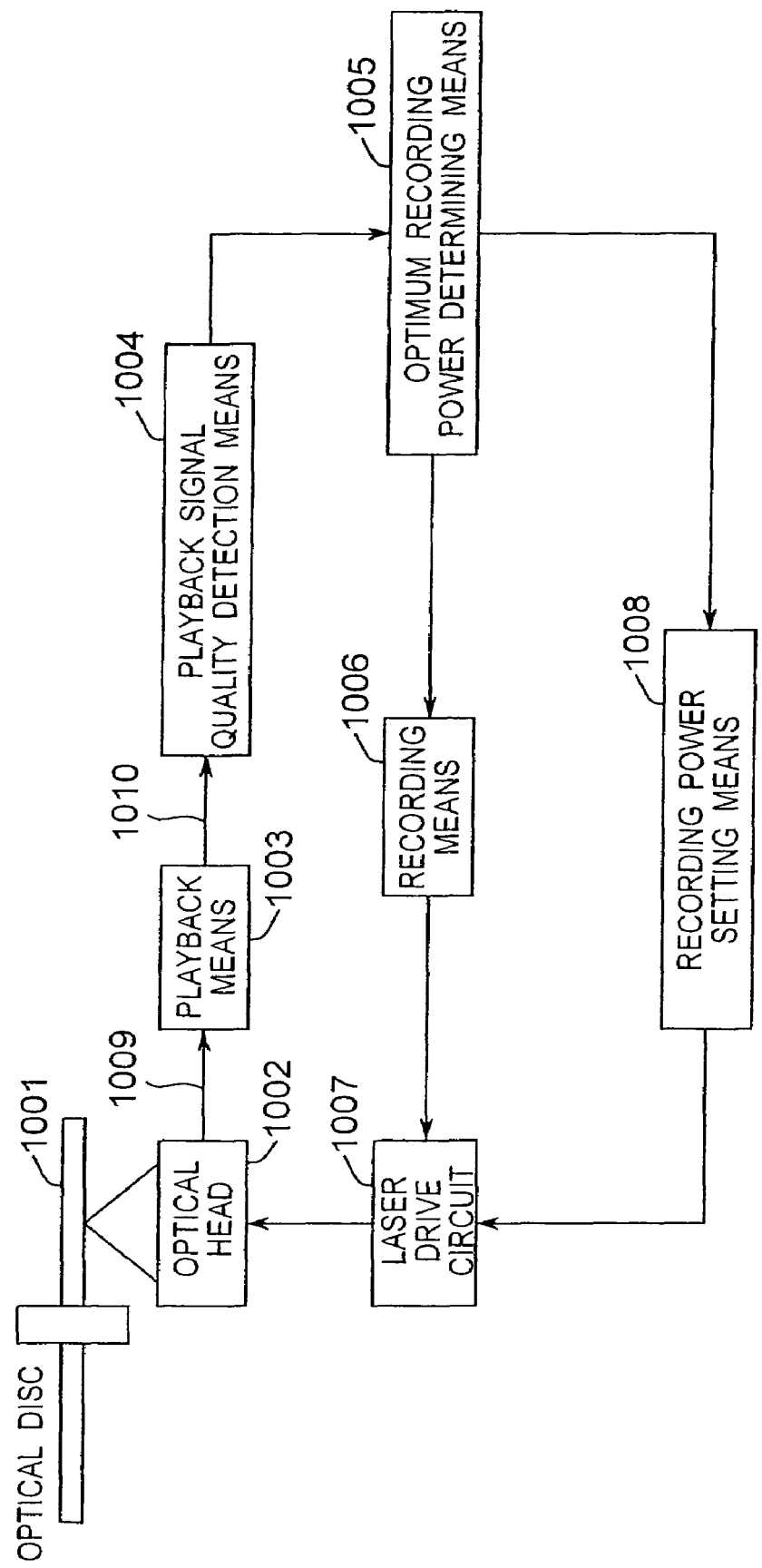
FIG. 14 is a block diagram of an optical disc drive according to the prior art.
Figure 15:
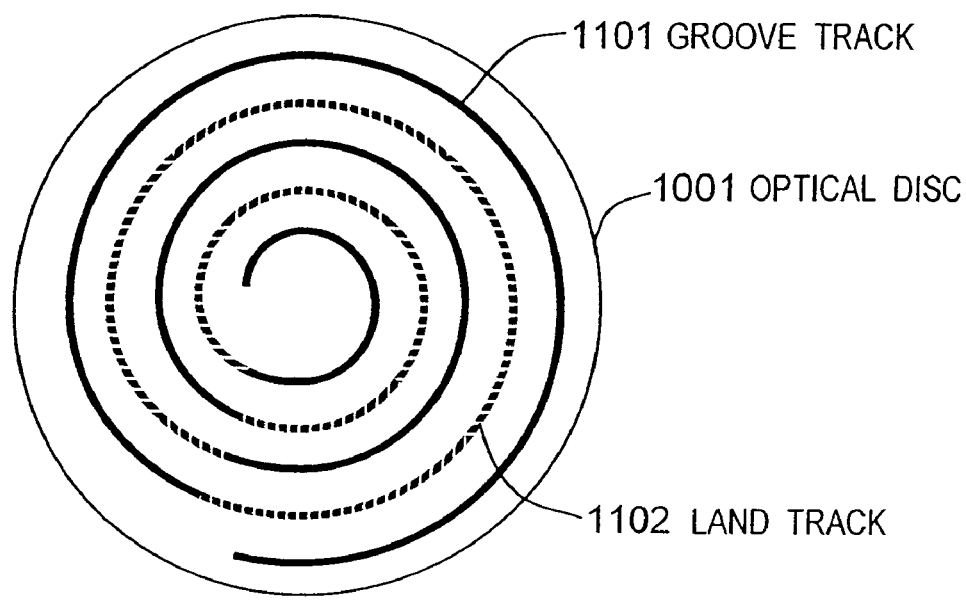
FIG. 15 is a track configuration diagram of an optical disc drive according to the prior art.
Figure 16:
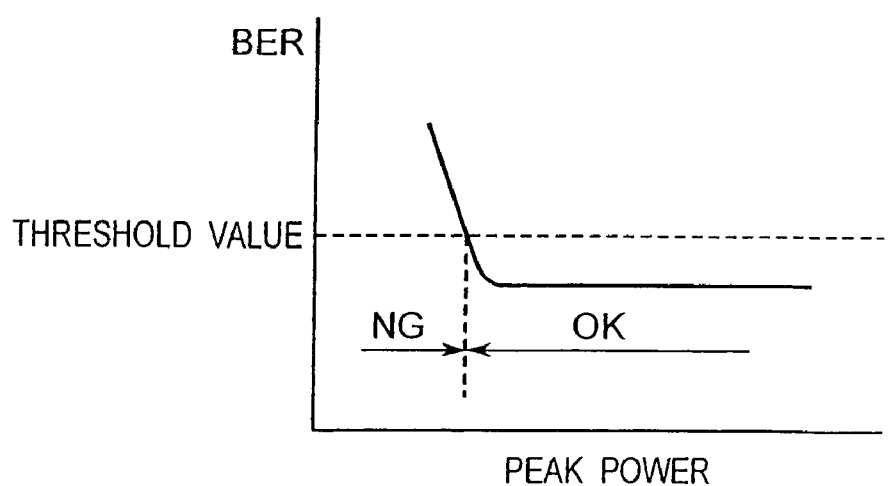
FIG. 16 is a graph of the correlation between peak power and BER.
Figure 17:
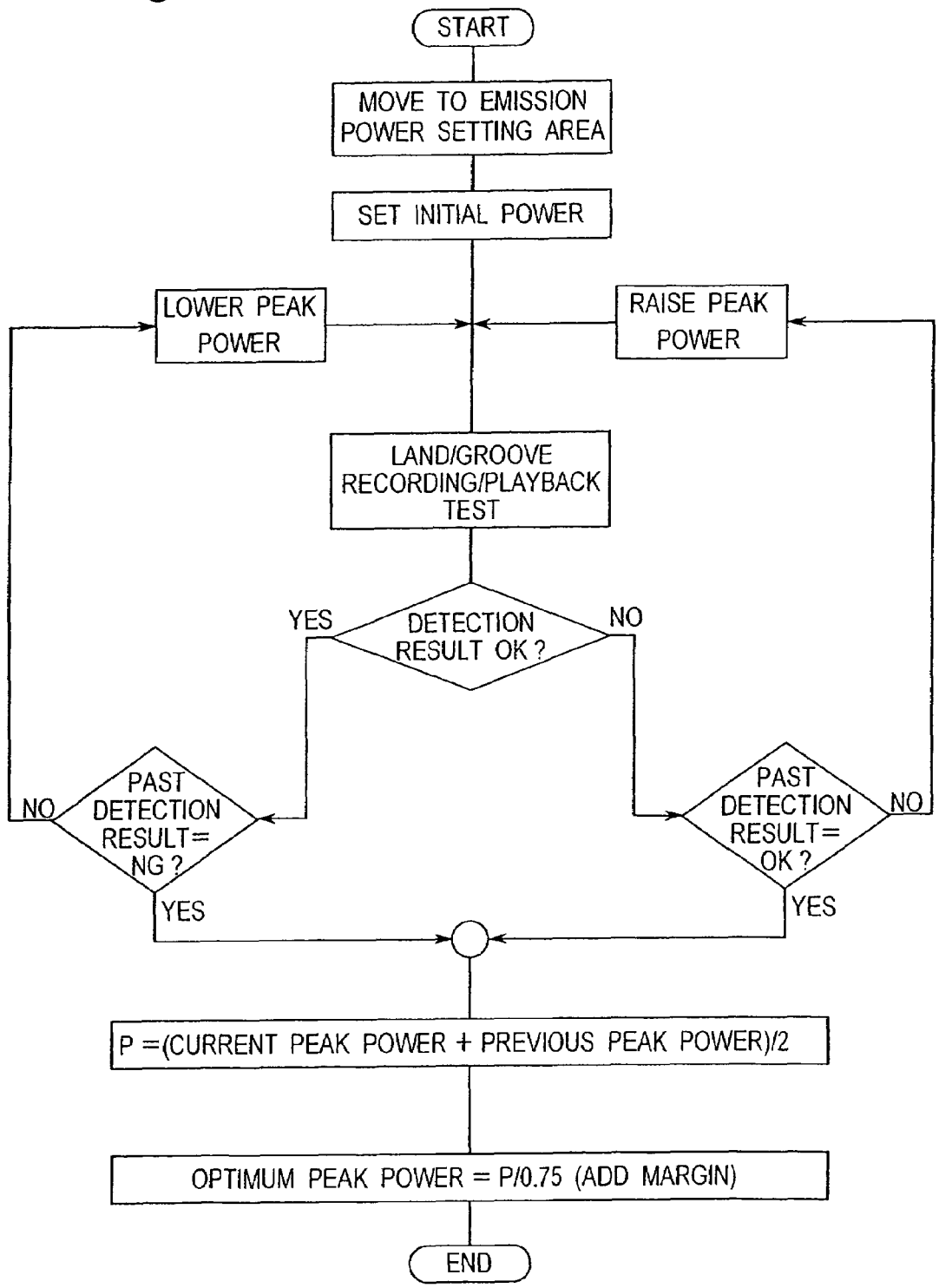
FIG. 17 is a flow chart according to the prior art.

A method for detecting jitter is described as an example of another method. The relationship between peak power and jitter is shown in FIG. 12. The horizontal axis in FIG. 12 is peak power and the vertical axis is jitter.

Jitter is a temporal offset between the playback signal and source signal, occurs because of a drop in the playback signal amplitude due to insufficient laser emission power, for example, decreases as the playback signal amplitude increases, and is substantially constant when the playback signal amplitude is saturated. Jitter is also increased by remnants such as those shown in FIG. 13. If the playback conditions are equal, recording is generally more accurate as jitter decreases. A sector is an OK sector if jitter is less than or equal to some threshold value, and is an NG sector if greater than or equal to the threshold value.

Jitter can be detected, for example, by using the output signal of a phase comparator comprising a PLL (phase locked loop) circuit that extracts a synchronization signal synchronized to the basic period of a digitized signal.

It should be noted that the playback signal quality detection means 104 of the present embodiment evaluates each sector without distinguishing land tracks and groove tracks, but each sector can be evaluated separately by land tracks and groove tracks. By separately evaluating land tracks and groove tracks, the recording power can be set appropriately for each track when the recording characteristics differ between the tracks.

Furthermore, by distinguishing land tracks and groove tracks during playback, it is not necessary to play back the other track after the recording power is determined for one track, and less time is needed for recording power determination.

It should be noted that the recording power setting means 108 sets the recording power without distinguishing land tracks and groove tracks, but the recording power can be set separately for land tracks and groove tracks. By distinguishing land tracks and groove tracks, a recording power that is appropriate to each track can be set as the initial power setting when the recording characteristics differ between the tracks, the number of times the recording power is set can be reduced, it is not necessary to record the other track after the recording power is determined for one track, less time is needed for recording power determination, and deterioration due to repeated recording can be reduced.

It will be further noted that the present embodiments are described with reference to an optical disc capable of recording to both land tracks and groove tracks, but the present embodiments also apply to optical discs that record to only one track.

The invention claimed is:

1. A recording power determination method of an optical disc drive for recording to an optical disc having a spiral track, said recording power determination method comprising:

recording on an area of the optical disc at a first recording power (P3);

recording, on the same area as the area recorded with the first recording power (P3) in said recording at the first recording power (P3), at a second recording power (P4) that is lower than the first recording power (P3) by a specific amount and playing back;

determining whether or not a specified playback signal quality is achieved with respect to a playback signal of data recorded at the second recording power (P4) in said recording at the second recording power (P4); and setting the recording power for data recording to a recording power that is greater than or equal to the second recording power (P4) and less than or equal to the first recording power (P3) when the specific playback signal quality is determined to be achieved in said determining.

2. A recording power determination method as described in claim 1, further comprising setting the recording power for data recording to the first recording power (P3).

3. A recording power determination method as described in claim 2, further comprising changing the first recording power (P3) when the specified playback signal quality is not determined to be achieved in said determining.

4. A recording power determination method as described in claim 2, further comprising test recording at multiple recording power settings, and determining the first recording power (P3) from the respective playback signal quality detection results at the multiple recording power settings.

5. A recording power determination method as described in claim 1, further comprising changing the first recording power (P3) when the specified playback signal quality is not determined to be achieved in said determining.

6. A recording power determination method as described in claim 5, further comprising test recording at multiple recording power settings, and determining the first recording power (P3) from the respective playback signal quality detection results at the multiple recording power settings.

7. A recording power determination method as described in claim 1, further comprising test recording at multiple recording power settings, and determining the first recording power (P3) from the respective playback signal quality detection results at the multiple recording power settings.

8. A recording power determination method of an optical disc drive for recording to an optical disc having a spiral track, said recording power determination method comprising:
  recording on an area of the optical disc at a second recording power (P3) that is greater than a first recording power (P2) by a specific amount;
  recording, on the same area as the area recorded with the second recording power (P3) in said recording at the second recording power (P3), at a third recording power (P4) that is lower than the first recording power (P2) by a specific amount and playing back;
  determining whether or not a specified playback signal quality is achieved with respect to a playback signal of data recorded at the third recording power (P4) in said recording at the third recording power (P4); and
  setting the recording power for data recording to a recording power that is greater than or equal to the third recording power (P4) and less than or equal to the first recording power (P2) when the specific playback signal quality is determined to be achieved in said determining.

9. A recording power determination method as described in claim 8, further comprising setting a recording power for data recording to the first recording power (P2).

10. A recording power determination method as described in claim 8, further comprising changing the first recording power (P2) when the specified playback signal quality is not determined to be achieved in said determining.

11. A recording power determination method as described in claim 8, further comprising test recording at multiple recording power settings, and determining the first recording power (P2) from the respective playback signal quality detection results at the multiple recording power settings.

12. An optical disc drive for recording to an optical disc having a spiral track, said optical disc drive characterized by comprising:
  a recording power setting unit operable to set a laser beam recording power;
  a recording unit operable to record;
  a playback unit operable to read;
  a playback signal quality detection unit operable to detect a playback signal quality; and
  a control unit operable to control said recording power setting unit, said recording unit, said playback unit and said playback signal quality detection unit,
  wherein by controlling said recording power setting unit, said recording unit, said playback unit, and said playback signal quality detection unit, said control unit is operable to:
  cause said recording unit to record on an area of the optical disc at a first recording power (P3);
  cause said recording unit to record, on the same area as the area recorded with the first recording power (P3), at a second recording power (P4) that is lower than the first recording power (P3) by a specific amount and then cause said playback unit to read;
  cause said playback signal quality detection unit to determine whether or not a specified playback signal quality is achieved with respect to a playback signal of data recorded by said recording unit at the second recording power (P4); and
  cause said recording power setting unit to set the recording power for data recording to a recording power that is greater than or equal to the second recording power (P4) and less than or equal to the first recording power (P3) when said playback signal quality detection unit determines that the specific playback signal quality is achieved.

13. An optical disc drive as described in claim 12, wherein said control unit is operable cause said recording power setting unit to set the recording power for data recording to the first recording power (P3).

14. An optical disc drive as described in claim 13, wherein said control unit is operable to cause said recording power setting unit to change the first recording power (P3) when said playback signal quality detection unit determines that the specified playback signal quality is not achieved.

15. An optical disc drive as described in claim 13, wherein said control unit is operable to cause test recording to be performed at multiple recording power settings, and cause the first recording power (P3) to be determined from the respective playback signal quality detection results at the multiple recording power settings.

16. An optical disc drive as described in claim 12, wherein said control unit is operable to cause said recording power setting unit change the first recording power (P3) when said playback signal quality detection unit determines that the specified playback signal quality is not achieved.

17. An optical disc drive as described in claim 16, wherein said control unit is operable to cause test recording to be performed at multiple recording power settings, and cause the first recording power (P3) to be determined from the respective playback signal quality detection results at the multiple recording power settings.

18. An optical disc drive as described in claim 12, wherein said control unit is operable to cause test recording to be performed at multiple recording power settings, and cause the first recording power (P3) to be determined from the respective playback signal quality detection results at the multiple recording power settings.

19. An optical disc drive for recording to an optical disc having a spiral track, said optical disc drive comprising:
  a recording power setting unit operable to set a laser beam recording power;
  a recording unit operable to record;
  a playback unit operable to read;
  a playback signal quality detection unit operable to detect a playback signal quality; and
  a control unit operable to control said recording power setting unit, said recording unit, said playback unit and said playback signal quality detection unit, wherein by controlling said recording power setting unit, said recording unit, said playback unit, and said playback signal quality detection unit, said control unit is operable to:

cause said recording unit to record on an area of the optical disc at a second recording power (P3) that is greater than a first recording power (P2) by a specific amount;

cause said recording unit to record, on the same area as the area recorded with the second recording power (P3), at a third recording power (P4) that is lower than the first recording power (P2) by a specific amount and cause said playback unit to read;

cause said playback signal quality detection unit to determine whether or not a specified playback signal quality is achieved with respect to a playback signal of data recorded at the third recording power (P4); and cause said recording power setting unit to set the recording power for data recording to a recording power that is greater than or equal to the third recording power (P4) and less than or equal to the first recording power (P2) when said playback signal quality detection unit determines that the specific playback signal quality is achieved.

20. An optical disc drive as described in claim 19, wherein said control unit is operable to cause said recording power setting unit to set the recording power for data recording to the first recording power (P3).

21. An optical disc drive as described in claim 19, wherein said control unit is operable to cause said recording power setting unit to change the first recording power (P2) when said playback signal quality detection unit determines that the specified playback signal quality is not achieved.

22. An optical disc drive as described in claim 19, said control unit is operable to cause test recording to be performed at multiple recording power settings, and cause the first recording power (P2) to be determined from the respective playback signal quality detection results at the multiple recording power settings.

23. A recording power determination method of an optical disc drive for recording to an optical disc having a spiral track by using a peak power P1, said recording power determination method comprising:

obtaining a provisional peak power P2 according to P2=K1×P1, where K1 is greater than 1;

obtaining an upper limit P3 according to P3=K2×P2, where K2 is greater than 1;

obtaining a lower limit P4 according to P4=K3×P2, where K3 is less than 1;

recording at the obtained upper limit P3;

recording at the obtained lower limit P4;

determining whether or not a specified playback signal quality is achieved; and setting the recording power for data recording to a recording power that is greater than or equal to the lower limit P4 and less than or equal to the provisional peak power P2 when the specific playback signal quality is determined to be achieved in said determining.

24. A recording power determination method as described in claim 23, further comprising changing the provisional peak power P2 when the specified playback signal quality is not determined to be achieved in said determining.

25. A recording power determination method as described in claim 23, further comprising test recording at multiple recording power settings, and determining the provisional peak power P2 from the respective playback signal quality detection results at the multiple recording power settings.

26. A recording power determination method of an optical disc drive for recording to an optical disc having a spiral track by using a power P1, said recording power determination method comprising:

obtaining a provisional peak power P2 according to P2=K1×P1, where K1 is greater than 1;

obtaining a lower limit P4 according to P4=K3×P2, where K3 is less than 1;

recording at the obtained provisional peak power P2;

recording at the obtained lower limit P4;

determining whether or not a specified playback signal quality is achieved; and setting the recording power for data recording to a recording power that is greater than or equal to the lower limit P4 and less than or equal to the provisional peak power P2 when the specific playback signal quality is determined to be achieved in said determining.

27. A recording power determination method as described in claim 26, further comprising changing the provisional peak power P2 when the specified playback signal quality is not determined to be achieved in said determining.

28. A recording power determination method as described in claim 26, further comprising test recording at multiple recording power settings, and determining the provisional peak power P2 from the respective playback signal quality detection results at the multiple recording power settings.

29. An optical disc drive for recording to an optical disc having a spiral track, said optical disc drive comprising:

a recording power setting unit operable to set a laser beam recording power by using a peak power P1;

a recording unit operable to record;

a playback unit operable to read;

a playback signal quality detection unit operable to detect a playback signal quality; and a control unit operable to control said recording power setting unit, said recording unit, said playback unit and said playback signal quality detection unit, wherein by controlling said recording power setting unit, said recording unit, said playback unit, and said playback signal quality detection unit, said control unit is operable to:

obtain a provisional peak power P2 according to P2=K1×P1, where K1 is greater than 1;

obtain an upper limit P3 according to P3=K2×P2, where K2 is greater than 1;

obtain a lower limit P4 according to P4=K3×P2, where K3 is less than 1;

cause said recording unit to record at the obtained upper limit P3;

cause said recording unit to record at the obtained lower limit P4;

cause said playback signal quality detection unit to determine whether or not a specified playback signal quality is achieved; and cause said recording power setting unit to set the recording power for data recording to a recording power that is greater than or equal to the lower limit P4 and less than or equal to the provisional peak power P2 when said playback signal quality detection unit determines that the specific playback signal quality is achieved.

30. An optical disc drive as described in claim 29, wherein said control unit is operable to cause said recording power setting unit to change the first recording power when said playback signal quality detection unit determines that the specified playback signal quality is not achieved.

31. An optical disc drive as described in claim 29, wherein said control unit is operable to cause test recording to be performed at multiple recording power settings, and cause the first recording power to be determined from the respective playback signal quality detection results at the multiple recording power settings.

32. An optical disc drive for recording to an optical disc having a spiral track, said optical disc drive comprising:

a recording power setting unit operable to set a laser beam recording power by using a peak power P1;

a recording unit operable to record;

a playback unit operable to read;

a playback signal quality detection unit operable to detect a playback signal quality; and a control unit operable to control said recording power setting unit, said recording unit, said playback unit and said playback signal quality detection unit, wherein by controlling said recording power setting unit, said recording unit, said playback unit, and said playback signal quality detection unit, said control unit is operable to:

obtain a provisional peak power P2 according to P2=K1×P1, where K1 is greater than 1;

obtain a lower limit P4 according to P4=K3×P2, where K3 is less than 1;

cause said recording unit to record at the obtained provisional peak power P2;

cause said recording unit to record at the obtained lower limit P4;

cause said playback signal quality detection unit to determine whether or not a specified playback signal quality is achieved; and cause said recording power setting unit to set the recording power for data recording to a recording power that is greater than or equal to the lower limit P4 and less than or equal to the provisional peak power P2 when said playback signal quality detection unit determines that the specific playback signal quality is achieved.

33. An optical disc drive as described in claim 32, wherein said control unit is operable to cause said recording power setting unit to change the provisional peak power P2 when said playback signal quality detection unit determines that the specified playback signal quality is not achieved.

34. An optical disc drive as described in claim 32, wherein said control unit is operable to cause test recording to be performed at multiple recording power settings, and cause the provisional peak power P2 to be determined from the respective playback signal quality detection results at the multiple recording power settings.

* * * * *